June 2, 1970  E. R. BLACK  3,515,143
FOUNDATION GARMENTS
Filed Feb. 10, 1969  5 Sheets-Sheet 1
FIG.1
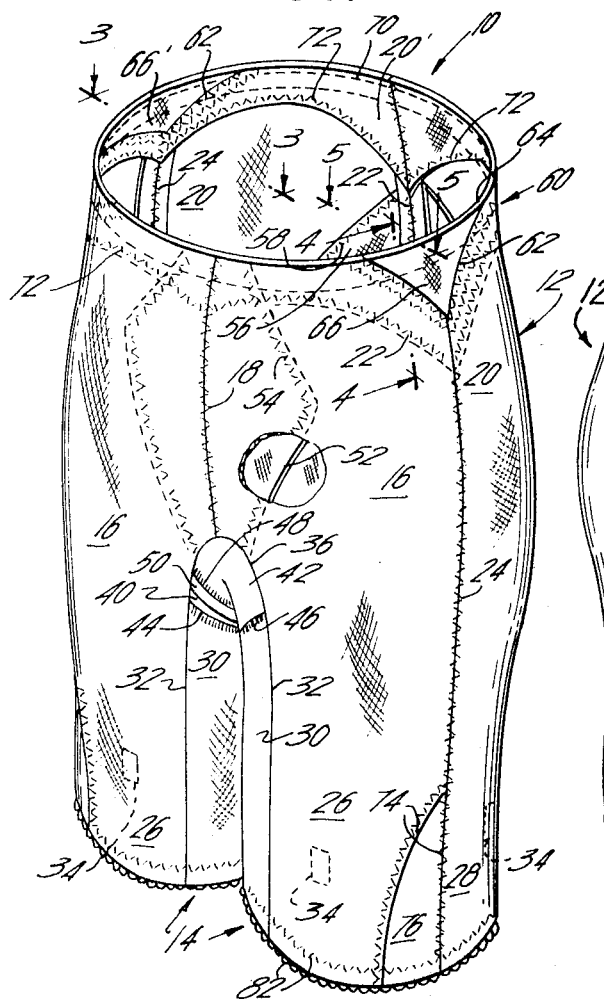
FIG.2
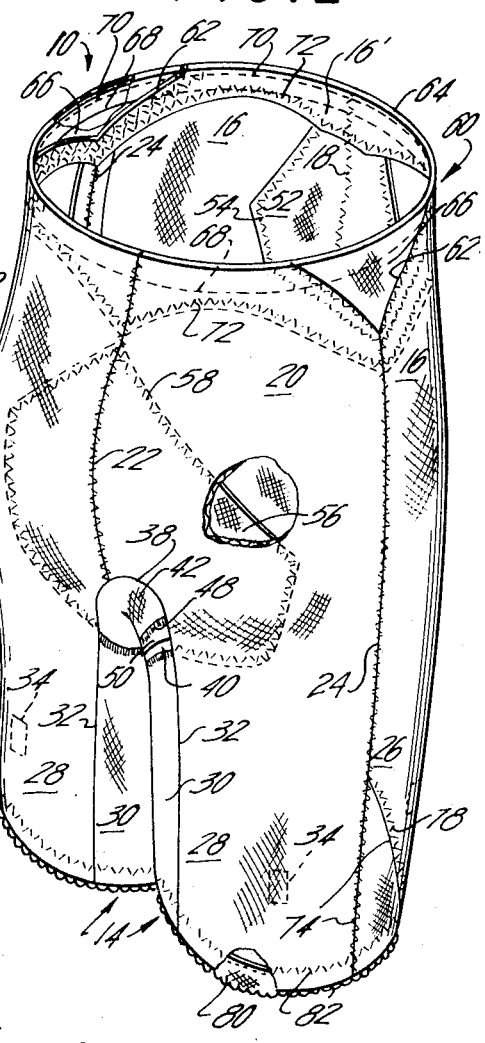
FIG.3
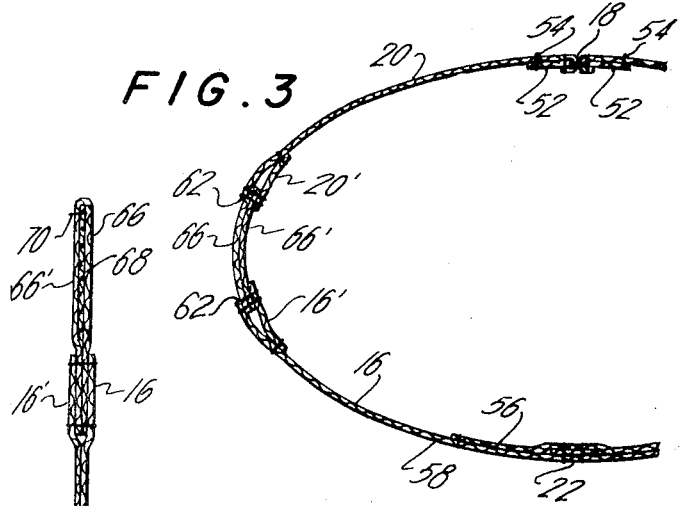
FIG.4
FIG.5
INVENTOR.
EILEEN ROCKWELL BLACK
BY
Rackenbach & Siegel
ATTORNEYS

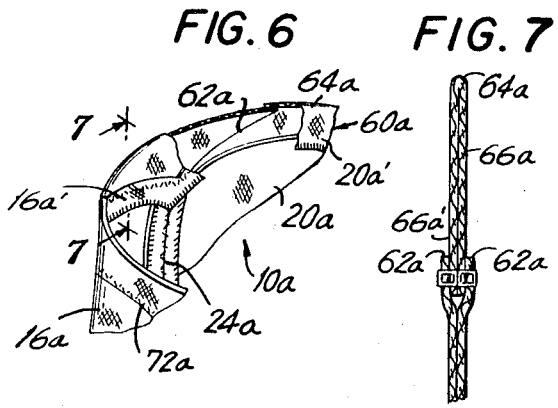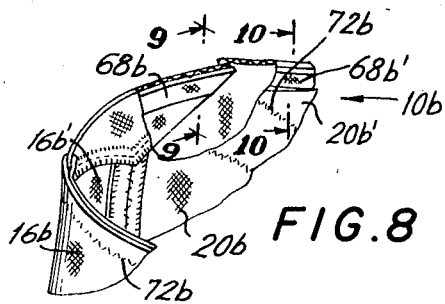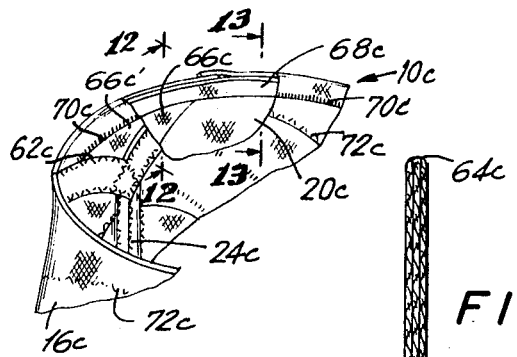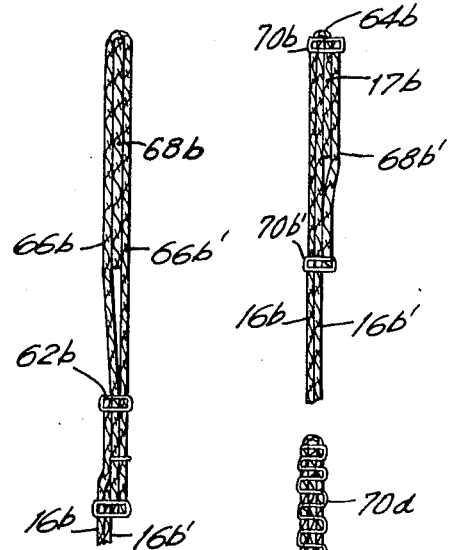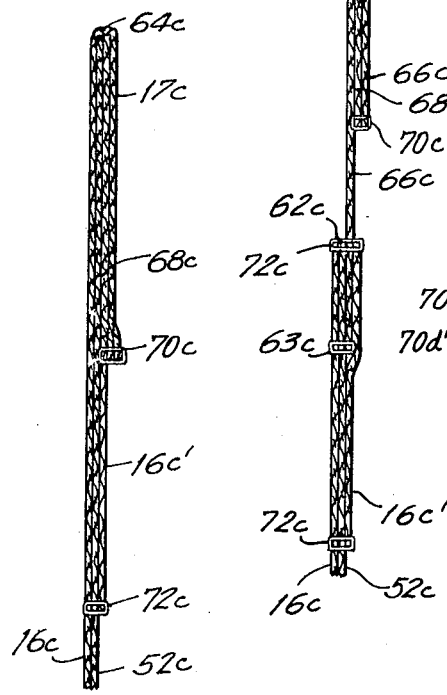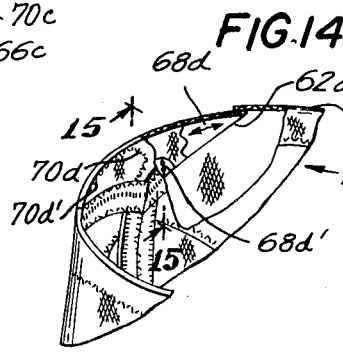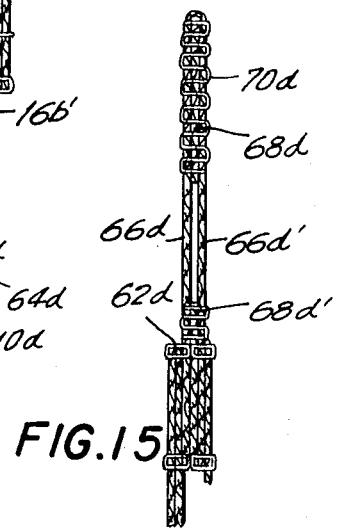

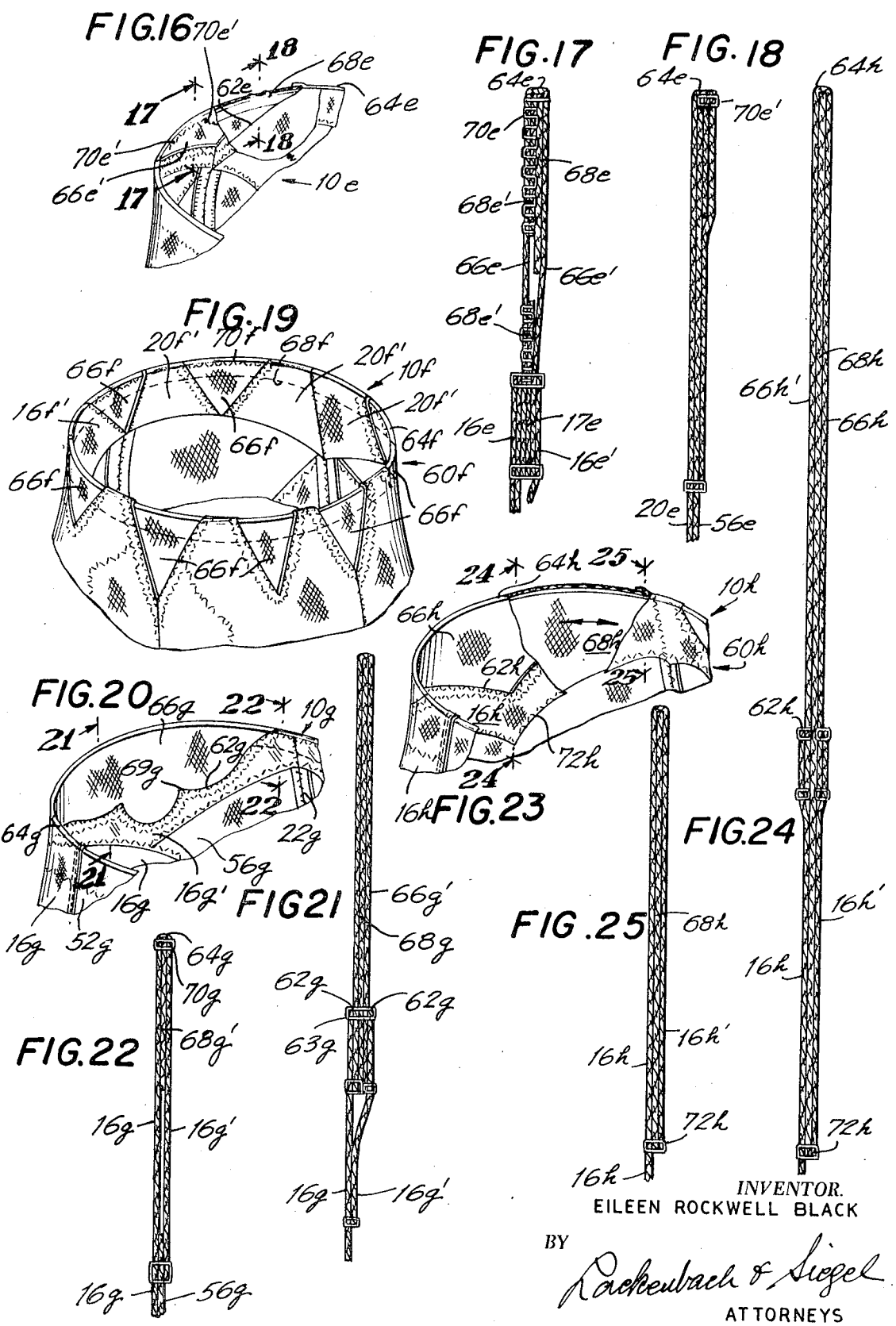

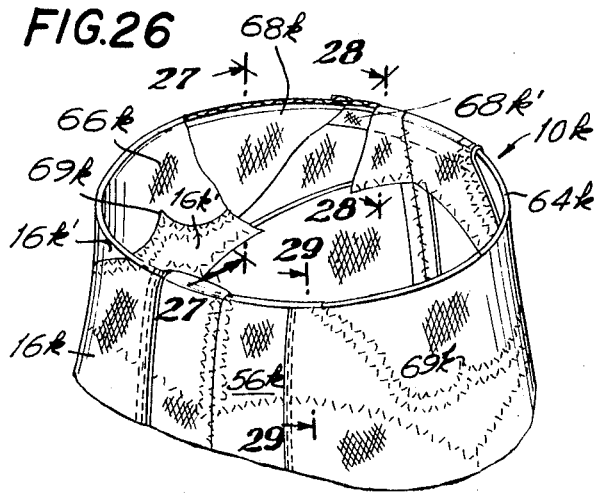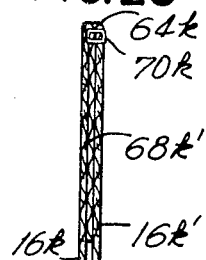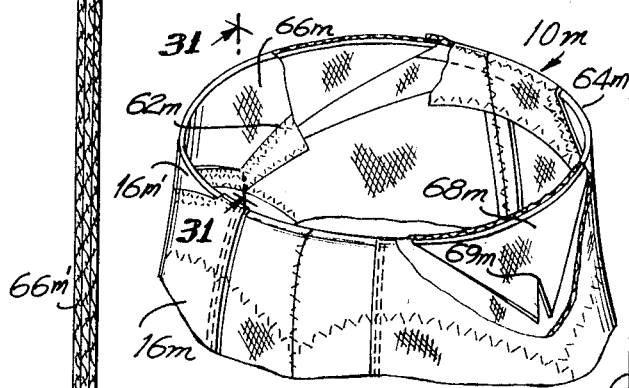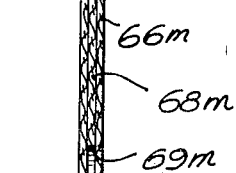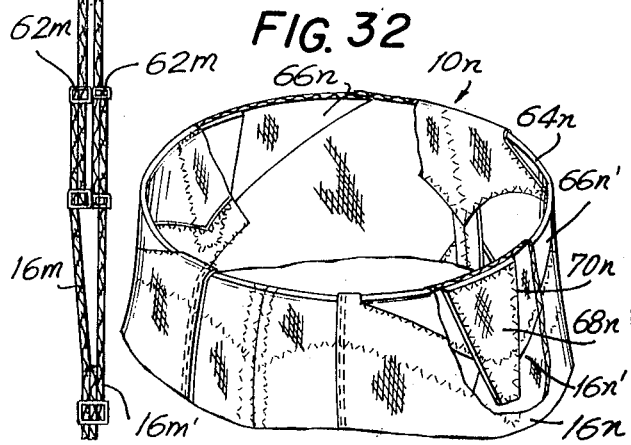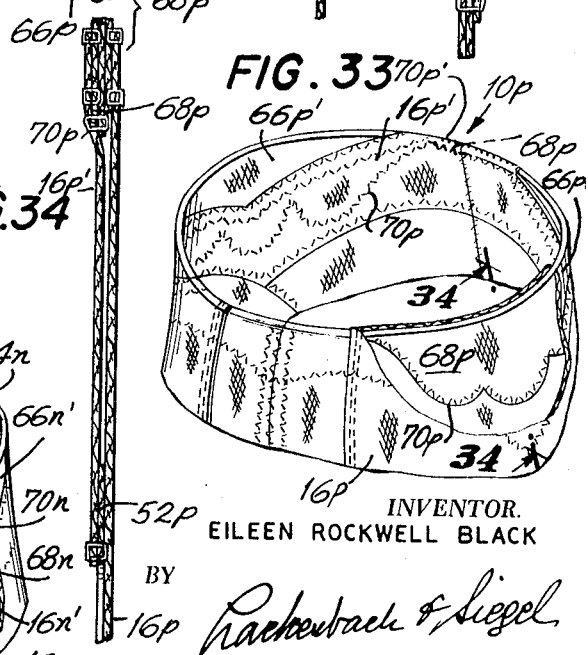
INVENTOR.
EILEEN ROCKWELL BLACK
BY Rachenbach & Siegel
ATTORNEYS June 2, 1970  E. R. BLACK  3,515,143
FOUNDATION GARMENTS
Filed Feb. 10, 1969  5 Sheets-Sheet 5
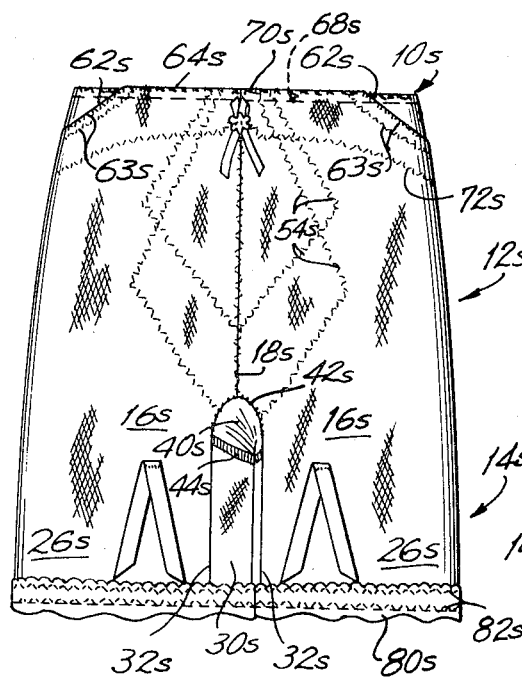
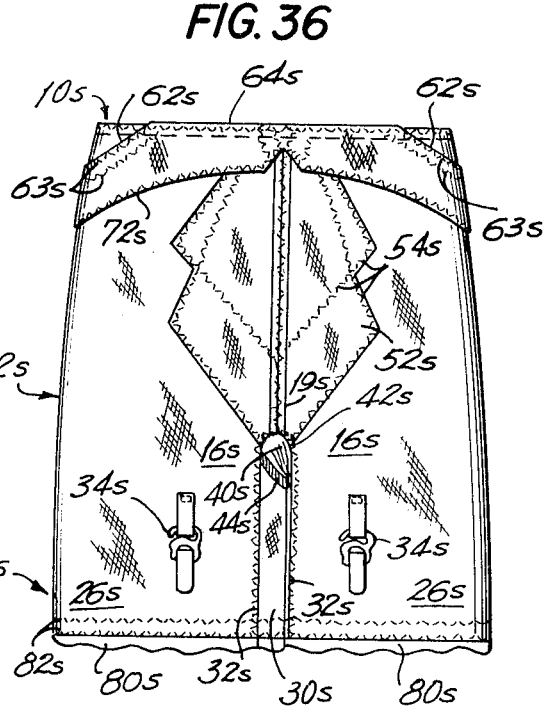
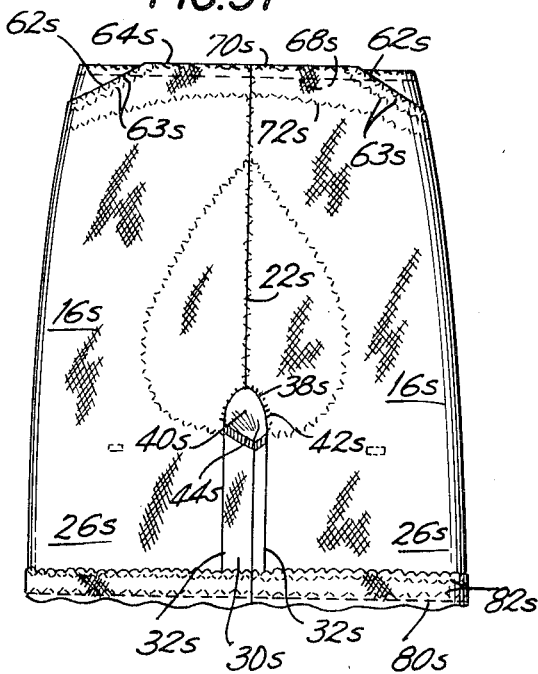
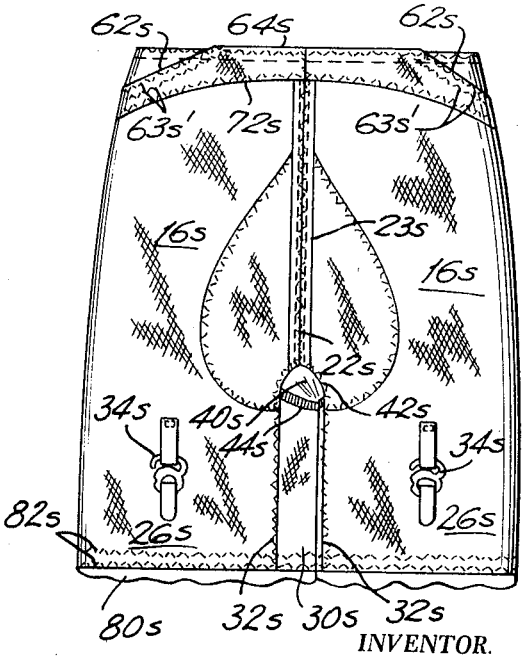
INVENTOR.
EILEEN ROCKWELL BLACK
BY
*Rachenbach & Liegel*
ATTORNEYS United States Patent Office 3,515,143
Patented June 2, 1970

3,515,143
FOUNDATION GARMENTS
Eileen R. Black, New York, N.Y., assignor to Flexnit Company, Inc., a corporation of Delaware
Continuation-in-part of applications Ser. No. 655,203, July 21, 1967, and Ser. No. 748,038, July 26, 1968. This application Feb. 10, 1969, Ser. No. 797,980
Int. Cl. A41c 1/00
U.S. Cl. 128—533
23 Claims

ABSTRACT OF THE DISCLOSURE

Foundation garments, such as girdles or the like, provided with means in the waistband region of the garment for automatically adjusting for increased pressures caused by non-standard developments and flesh shifting when the wearer sits, stoops or bends so that the tendency of the waistband to roll over may be substantially reduced or eliminated without substantially adversely affecting the control or slimming power of the garment.

---

This application is a continuation-in-part of my co-pending United States application for Letters Patent Ser. No. 655,203 filed on or about July 21, 1967 and entitled Foundation Garment and a continuation-in-part of my co-pending application Ser. No. 748,038 filed on or about July 26, 1968 and entitled Foundation Garment and hereby expressly incorporates by reference as if fully repeated herein, the complete and entire disclosures and each and every part thereof.

This invention relates to foundation garments and, more particularly, to foundation garments constructed and arranged to substantially reduce or eliminate the tendency of the marginal portions thereof to roll over or wrinkle.

At the outset, it is to be expressly understood that the present invention is herein described, disclosed, illustrated and shown as applied to panty-type girdles for exemplary purposes only, and this invention is not to be deemed limited thereby. The present invention is equally applicable to substantially any other foundation garment, such as open girdles, corsets, back supports, or the like, and even to garments generally for use by both men and women, such as swimsuits, trousers, shorts, pants, or the like, and is equally applicable for use at the waistline region, or at any other opening, such as leg openings.

In a recent market research survey, wherein four hundred women were interviewed in depth for about two hours each and the results tabulated and analyzed, a significant problem regarding girdles and panty girdles was discovered. The report states: "The most frequent mentioned complaint about girdles is that the waistbands roll over. Based solely on consumer complaints, it would seem advisable to make a concerted effort to re-design the waist area of girdles so that the waist does not bind or roll over. This is, indeed, a difficult task since women are probably not willing to sacrifice any control or slimming action in return for these improvements."

Attempts to solve these problems in the past have been generally unsatisfactory. The use of boning or wiring causes discomfort, particularly in view of the bulk and lack of flexibility thereof. Moreover, prior foundation garments have been found to be uncomfortable either because of excessive weight, binding, or the tendency of the garment to ride or bunch.

Having in mind the foregoing, it is a primary object of the present invention to provide garments such as foundation garments constructed and arranged to reduce the tendency of the marginal regions thereof to roll over, bind or wrinkle.

Another primary object of the present invention, in addition to the foregoing object, is to provide such garments which are economical to manufacture and which are comfortable and durable in use.

Yet another primary object of the present invention, in addition to each of the foregoing objects, is to provide such garments with means to reduce any tendency of the waistline portion or waistband thereof to roll over, bind or wrinkle.

Still another primary object of the present invention, in addition to each of the foregoing objects, is to provide such garments capable of automatically and immediately adjusting to added pressures caused by the flesh shifting when the wearer sits, stoops or bends.

Still another primary object of the present invention, in addition to each of the foregoing objects, is to provide such garments without much loss of control or slimming power.

Another and still further primary object of the present invention, in addition to the foregoing objects, is to provide such garments which may be comfortably worn by persons having a waist measurement which falls between standard waist sizes, or which is non-standard with respect to the hip size.

Yet still further, it is another primary object of the present invention, in addition to each of the foregoing objects, to provide such foundation garments which provide full slimming power and control in the regions of the wearer's hips, abdomen and derriere while being provided with means in the waistline region for automatically adjusting for waist measurements which fall between standard waist sizes, or which are non-standard with respect to the hip size, i.e., of non-standard development, and to added pressures caused by flesh shifting when the wearer sits, stoops or bends so that a tendency of the waistband to roll over may be substantially reduced or eliminated.

Yet further, it is still another primary object of the present invention, in addition to each of the foregoing objects, to provide foundation garments having a region of reduced stress adjacent the waistband and a narrow waistband of increased stress so that rollover in the waistband region may be substantially reduced or eliminated.

The invention resides in the combination, construction, arrangement and disposition of the various component parts and elements incorporated in improved garments constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIG. 1 is a perspective drawing of a panty girdle constructed in accordance with the principles of the present invention as seen generally from the front and left side thereof;

FIB. 2 is a perspective view of the garment of FIG. 1 as seen from the rear and right side thereof;

FIG. 3 is a cross-sectional plan view taken along line 3—3 of FIG. 1;

FIG. 4 is a partial elevational cross-sectional view taken along line 4—4 of FIG. 1;

FIG. 5 is a cross-sectional plan view taken along line 5—5 of FIG. 1;

FIG. 6 is a perspective drawing of the side waistline region of another panty girdle constructed in accordance with the principles of the present invention as seen generally from above and inside thereof;

FIG. 7 is an elevational cross-sectional view taken along line 7—7 of FIG. 6;

FIG. 8 is a perspective drawing of a side waistband portion of yet another panty girdle constructed in accordance with the principles of the present invention as seen generally from above and inside thereof;

FIGS. 9 and 10 are, respectively, elevational cross-sectional views taken along lines 9—9 and 10—10 of FIG. 8;

FIG. 11 is a perspective drawing of a side waistband region of yet still another panty girdle constructed in accordance with the principles of the present invention as seen generally from above and inside thereof;

FIGS. 12 and 13 are, respectively, elevational cross-sectional views taken along lines 12—12 and 13—13 of FIG. 11;

FIG. 14 is a perspective drawing of a side waistband region of another and still further panty girdle constructed in accordance with the principles of the present invention as seen generally from above and inside thereof;

FIG. 15 is an elevational cross-sectional view taken along line 15—15 of FIG. 14;

FIG. 16 is a perspective drawing of a side waistband region of another and still further panty girdle constructed in accordance with the principles of the present invention as seen generally from above and inside thereof;

FIGS. 17 and 18 are, respectively, elevational cross-sectional views taken along lines 17—17 and 18—18 of FIG. 16;

FIG. 19 is a perspective drawing of the waistband region of another and yet still further panty girdle constructed in accordance with the principles of the present invention looking generally down from the front and side thereof;

FIG. 20 is a perspective drawing of a side waistband region of a still further panty girdle constructed in accordance with the principles of the present invention as seen generally from above and inside thereof;

FIGS. 21 and 22 are elevational cross-sectional views taken along lines 21—22 and 22—22, respectively, of FIG. 20;

FIG. 23 is a perspective drawing of the side waistband region of yet another panty girdle constructed in accordance with the principles of the present invention looking generally downwardly from a location at the front and side thereof;

FIGS. 24 and 25 are, respectively, elevational cross-sectional views taken along lines 24—24 and 25—25 of FIG. 23;

FIG. 26 is a perspective drawing of the waistband region of a panty girdle constructed in accordance with the principles of the present invention looking generally downwardly from a location generally at the front and side thereof;

FIGS. 27, 28 and 29 are, respectively, elevational cross-sectional views taken along lines 27—27, 28—28 and 29—29 of FIG. 26.

FIG. 30 is a perspective drawing of the waistband region of another and yet still further panty girdle constructed in accordance with the principles of the present invention viewed generally downwardly from a location at the front and side thereof;

FIG. 31 is an elevational cross-sectional view taken along line 31—31 of FIG. 30;

FIGS. 32 and 33 are, respectively, generally downwardly viewed perspective drawings of other panty girdles constructed in accordance with the principles of the present invention as seen generally from the front and side thereof;

FIG. 34 is an elevational cross-sectional view taken along line 34—34 of FIG. 33;

FIG. 35 is a front elevational view of another foundation garment constructed in accordance with the principles of the present invention;

FIG. 36 is a front elevational view of the garment shown in FIG. 35 as seen from the interior thereof;

FIG. 37 is a rear elevational view of the foundation garment shown in FIGS. 35 and 36; and FIG. 38 is a rear elevational view of the foundation garment shown in FIGS. 35–37, as seen from the interior thereof.

With reference now to the drawing, and particularly to FIGS. 1–5 thereof, there is shown and illustrated a foundation garment, such as a panty girdle constructed in accordance with the principles of the present invention and designated generally by the reference character 10. It will be noted that the principles of the present invention are illustrated in the drawing as being applied to a foundation garment of the panty-girdle type and, it is to be understood as the ensuing description proceeds that the present invention is equally applicable to substantially all garments. In other words, the present invention is equally applicable to substantially any other foundation garment, such as open girdles, corsets, back supports, long-line brassieres, corselettes, or the like, and even to garments generally for use by both men and women, such as swimsuits, trousers, shorts, pants, garter belts, or the like, and is equally applicable for use at the waistline region or any other opening, such as leg openings.

The garment 10 may comprise a torso-encircling portion 12 and generally vertically downwardly extending leg encircling portions 14. The torso-encircling portion 12 may be particularly adapted to encompass the lower torso of the wearer and specifically those portions known as abdomen, hips and derriere. The leg encircling portion 14 may be particularly adapted to encompass the legs of the wearer and, specifically those portions thereof known as the thighs.

The torso-encircling portion 12 may comprise front panels 16 joined together as by stitching along a front center seamline 18 and rear panels 20 joined together along a rear center seamline 22. Each of the front panels 16 and rear panels 20 may be structurally associated together, as by means of stitching along a pair of generally vertically extending side seams 24. The panels 16 and 20 may be fabricated of any suitable material and preferably are fabricated of a material having elastic threads extending in each of a plurality of directions. Each of the seams heretofore referred to may be permanently secured together, as by stitching as heretofore described and as illustrated in the drawings or may be partially or entirely separable or adjustable, as by means of zippers, tie cords, separable fasteners, or the like.

Each of the panels 16 and 20 may comprise generally downwardly extending leg-encompassing sections 26 and 28, respectively, which in conjunction with other panels of the garment 10 to be described hereinafter, may be particularly adapted to encompass the legs of the torso to define the leg encircling portions 14. As illustrated, inner panels 30 may be provided, preferably fabricated of the same material as the panels 16 and 20 and associated therewith, as by means of stitching extending along generally vertically extending leg seams 32. It will now be understood that leg-encircling portions 14 may be particularly adapted to further comprise suitable fasteners 34 for fastening hosiery (not shown) relative to the garment 10.

The front and rear panels 16 and 20 may each be provided with generally curvalinear recesses 36 and 38, respectively, configured to provide an opening in the crotch region of the wearer. Extending between the recesses 36 and 38 for covering the crotch region of the wearer, there may be provided inner and outer crotch panels 40 and 42 structurally associated with the front and rear panels 16 and 20 as by means of stitching extending along the edges of the recesses 36 and 38. The crotch panels 40 and 42 may be disposed in overlapping relationship, as shown, with the inner crotch panel 40 being structurally associated with one of the inner leg panels 30 as by means of stitching 44 and the outer crotch panel 42 being structurally associated with the other of the inner leg panels 30 as by means of stitching 46. The free edges of the overlapped inner and outer crotch panels 40 and 42 may be overturned and stitched, as illustrated, as by means of stitching 48 defining hems 50 to provide for smoothness, comfort and wearability.

It will be evident from the foregoing that the inner and outer crotch panels 40 and 42 may be readily shifted or separated when desired to allow performance of natural body functions without any obstruction or the necessity of removing the garment from the body of the wearer.

The torso-encircling portion 12 of the garment 10 may further comprise abdominal control means, such as a generally diamond-shaped abdominal control panel 52 structurally associated interiorly of the front panel 16 and underlying the front seamline 18. The abdominal control panel 52 may preferably comprise an elastic material having the primary vertical stretch characteristic and may be structurally associated with the front panel 16 as by means of the stitching extending along the front center seamline 18 and by stitching 54 extending generally peripherally about the panel 52.

The garment 10 may be further provided with derriere control means such as a rear control panel 56 structurally associated with the rear panel 20 as by means of stitching extending along the rear seamline 22 and by stitching 58 extending generally peripherally about the panel 56. As shown, the rear control panel 56 may be configured generally to the shape of an inverted heart.

As heretofore pointed out, it is a primary object of the present invention to provide in foundation garments of the class described means for enabling automatic adjustment of the garment adjacent an opening thereof for limited expansion to accommodate non-standard development or a difference, for example, between the waist measurement of a wearer having a specified hip measurement compared with that which the manufacturer of the garment has utilized as his design standard or average waist-hip relationship and to reduce or substantially preclude and eliminate any tendency of the garment to roll over or wringle adjacent that opening such as at the waistband region thereof. To enable such automatic or self-adjusting easing and reduce or substantially preclude rollover and wrinkling, the waistband region of the garment 10, designated generally by the reference character 60 may be constructed and arranged to provide peripherally spaced apart regions of increased and decreased elasticity at the upper margin or waistline 64 which rapidly blend toward an average elasticity a short distance downwardly from the waistline 64 and substantially the same as the elasticity of the front and rear panels 16 and 20.

In other words, the elasticity of the front and rear panels 16 and 20 may substantially define the overall control or slimming power of the garment and generally over the hips and thighs of the wearer. Localized additional restriction and control may be provided in the abdominal and derriere regions by the abdominal control and derriere control panels 52 and 56, respectively. Waistband control may be provided by the means hereinafter more particularly set forth which enables a transition from the generally uniform control provided downwardly of the waistband region to the interrupted or laterally variable control provided at the waistline whereat alternating regions of high and low elasticity are provided encircling the waistline having an average elasticity similar to that of the remainder of the garment to maintain slimming and control throughout the waistband region but which is yet variable laterally about the garment to automatically or self-adjustably ease the waistline to accommodate non-standard development and reduce or substantially preclude rollover and bunching. The waistband region may taper and provide a smooth uniformly controlling transition between the waistline whereat the elasticity varies rubstantially laterally thereof but which has an average elasticity which may be substantially the same as the overall elasticity of the garment downwardly to the body of the garment lying below the waistband region whereat the elasticity is generally uniform around the garment except as modified by the local control of the abdominal and derriere panels 52 and 56.

Accordingly, the waistband region 60 of the garment 10 may be further provided with a plurality of cutouts, such as wedge-shaped cutouts 62 at each side portion thereof extending generally inwardly of the garment 10 from the opening thereof, or generally downwardly of the waistline 64 as shown and illustrated in FIG. 1. Wedge-shaped elastic fabric means, such as wedge-shaped elastic mesh fabric panels 66 may be structurally associated with the garment 10 within the cutout 62 and extending thereacross and structurally associated with the front and rear panels 16 and 20 as by means of stitching extending along the edges of the cutouts 62 as shown and illustrated to maintain the continuity of the garment along the waistband region 60 thereof.

The wedge-shaped inserts or elastic mesh fabric panels 66 may preferably be fabricated of a material having generally greater stretch than the front and rear panels 16 and 18 to enable the waistband region 60 of the garment 10 to give extra stretch when the wearer sits, stoops or bends. This extra stretch enables the garment to adjust immediately to the added pressure caused by the flesh shifting when the wearer sits, stoops or bends, thus eliminating the tendency of the waistband to rollover. This added stretch also enabels the garment to open to add at least one-half size to the garment to accommodate women whose waist size falls between the standard sizes in which garments are normally made. Hence, although most garments are graded on a so-called "standard grade" basis; i.e., there is a definite and consistent relationship between the hip size and the waist size. While each manufacturer may have his own standards they are generally consistent throughout most of his product line. Since a woman may have a development somewhat at variance with the so-called "standard development," this invention permits her to comfortably wear a standard rather than a custom made garment because the mesh inserts 66 can expand to adjust for slight differences in the wearer's measurements, as compared to the standard development, while at the same time reducing or substantially precluding any tendency of the garment to roll over or wrinkle at the waistband region.

It is important to note that the mesh inserts 66 are generally wider at the waistline margin thereof tapering or narrowing as they extend downwardly of the garment within the cutouts 62. Hence, there is a gradual and continuous tapering or transition between the waistline whereat the relatively long expanse of the easy stretch mesh inserts 66 substantially relieves that portion of the garment to the lower tip of the inserts 66 whereat the effect due to the easy stretch material of the mesh inserts becomes negligible immediately prior to disappearing altogether.

To further aid in reducing any tendency of the waistband region 60 of the garment 10 to roll over, the upper margin or waistline 64 of the garment may be disposed well above the actual waistline of the wearer or designed waistline point of the garment, i.e., the front and rear panels 16 and 20 may be extended well above the designed top or waistline point with the cutouts 62 and mesh inserts 66 similarly disposed above the designed top or waistline point of the garment 10, as shown.

Furthermore, the mesh inserts or generally wedge-shaped elastic mesh fabric panels 66 may comprise one or a plurality of layers of elastic material. For example, the inserts or wedge-shaped elastic mesh fabric panels may be inserted in the cutouts 62 as a double or folded piece of fabric, the fold line thereof being disposed at the upper margin or waistline 64 of the garment 10. To yet further eliminate the tendency of the waistband to roll over, the garment 10 may further comprise a piece of, for example, three-quarter inch elastic web 68 which may be stitched, as by means of stitching 70 to one side or layer 66' of the folded elastic mesh 66 before folding to constrict some of the easy stretch thereof at the waistline 64. Therefore, the waistband region 60 will stay in place on the torso while providing a gradual easing of elastic downwardly toward the bottom of the cutout 62. In the particular garment shown and illustrated, these pieces have been set into the cutouts, but a similar effect could also be effectuated by running the long easy stretch elastic all around the top of the garment 10 to become a part of the turnback design shown and illustrated on the face of the garment.

Furthermore, to yet still further eliminate the tendency of the waistband to roll and to reduce the loss of control or slimming power, the waistband region 60 may be further constructed and arranged to reinforce or increase the elasticity by decreasing the stretch thereof in regions of the waistband 60 laterally spaced apart from the cutouts 62 and along easy stretch elastic web inserts 66 so that the average stretch or elasticity throughout the waistband region 60 will remain substantially constant and similar to the stretch or elasticity of the front and rear panels 16 and 20. Accordingly, the front and rear panels 16 and 20 may be folded over at the upper margin or waistline 64 and stitched together, as by stitching 72 along a generally curvilinear path to thereby provide a reinforced or doubled marginal region to the garment 10 comprising generally wedge-shaped portions 16' and 20' to taper the decreased stretch or increased elasticity resulting thereby similar to the tapered increased stretch and decreased elasticity of the inserts 66.

Similarly, the lower marginal portions of the garment 10 and particularly the lower end portions of the leg portions 14 may be provided with wedge-shaped cutouts 74 and a panel 76 of elastic mesh fabric inserted within each of the leg cutouts 74 and structurally associated therewith, as by means of stitching 78 and the side seam stitching 24. The lower margin of the leg sections 26 and 28 may also, if desired, be turned back or turned over and provided with a peripherally extending narrow elastic web 80 structurally associated therewith, as by means of stitching 82.

In the embodiment or modification heretofore described and disclosed, the narrow elastic band 68 extends entirely about the garment 10 in the waistband region 60 and adjacent the waistline 64 thereof and is secured therewith by the stitching 70 extending only inwardly of the garment.

However, it is to be expressly pointed out that the elastic band 68 may extend only partially about the waistband 60; may be secured therewith other than by stitching extending only inwardly thereof or may be eliminated altogether. Accordingly, and with reference now to FIGS. 6 and 7, there is shown and illustrated a portion of yet another foundation garment constructed in accordance with the principles of the present invention and designated generally by the reference character 10a.

Before proceeding, it is pointed out that in the embodiment or modification of the garment shown and illustrated in FIGS. 6 and 7 and hereinafter described and disclosed, as well as in each and every one of the other embodiments or modifications hereinafter described, disclosed, illustrated and shown like reference characters will be utilized in the several views for like parts and similar reference characters but having differing suffixes will be utilized throughout the several illustrations for parts which are similar to those heretofore described and disclosed yet not identical. Additionally, in the interest of eliminating the necessity for repeating illustrative and descriptive materials relating to the several embodiments or modifications herein described, disclosed, illustrated and shown, only those portions of the various embodiments or modifications which differ in a substantial respect have been illustrated and shown and will be hereinafter described and disclosed, it being expressly understood that those portions thereof not expressly and in terms described, disclosed, illustrated and shown are to be deemed as if fully repeated in each instance and similar to those embodiments or modifications which are in terms specifically described, disclosed, illustrated and shown.

Accordingly, having in mind the foregoing, the waistband region 60a of the garment 10a comprises only mesh inserts 66a structurally associated with cutouts 62a, as by stitching, or the like, along the margins thereof with the front and rear panels 16a and 20a, respectively, turned inwardly and over at the waistline 64a and stitched to the front and rear panels 16a and 20a, as by means of stitching 72a along a generally curvilinear edge in the manner heretofore set forth. The elastic band or web 68 and its associated stitching 70 has been eliminated but it is to be particularly noted that the inserts 66a are of generally downwardly wedge-shaped configuration as is the turned-back design of the front and rear panels 16a and 20a, as defined by the stitching 72a so as to effectuate a smooth transition from alternating high and low stretch regions along the waistline downwardly to the body of the garment.

Referring now to FIGS. 8–10, there is shown and illustrated yet another garment designated generally by the reference character 10b wherein the contoured waistband reinforcing portions 16b' and 20b' comprises separate contoured panels of material, rather than turned back portions of the front and rear panels, as in the hereinbefore described garments. Yet further, the narrow elastic band 68 comprises separate portions 68b disposed between the folded over portions of the web inserts 66b and 66b' and portions 68b' extending generally around the inside of the garment 10 subjacent the front and rear panels laterally or transversely outwardly of the mesh inserts 66. The portions 68b may be freely suspended within the cutouts 62b and between the mesh insert portions 66b and 66b', being secured with the garment 10b only by the stitching extending along the edges of the cutouts 62b. The front and rear panels 16b may be hemmed, at the upper edges thereof to overlap the upper edges of the portions 16b', as designated by the reference character 17b in FIG. 10 and the elastic web portions 68b' secured generally longitudinally entirely thereof with the underlying panels 16b, 16b', 20b and 20b', as by stitching 70b extending adjacent the waistline 64b and stitching 70b' extending along the lower edge of the elastic band portions 68b'.

With reference now to FIGS. 11–13 wherein there is shown and illustrated yet still another garment constructed in accordance with the principles of the present invention designated generally by the reference character 10c wherein the narrow elastic band 68c extends completely around the waistline and is secured only at the lower edge thereof inside the garment by the stitching 70c. In fabricating the garment 10c, the mesh inserts 66c may be secured within the cutouts 62c, as by stitching 63c adjacent the edges thereof. Then, the waistline reinforcing panels 16c' and the elastic band 68c may be secured with the inner panels, outer panels and mesh inserts 16c, 20c and 66c, respectively, by the stitching 70c following which the assembly may be folded downwardly and inwardly along the upper edge of the elastic band 68c to define the waistline edge 64c and the waistline reinforcing panels 16c' and 20c' be secured in underlying relationship with the front and rear panels 16c and 20c, as by the stitching 72c.

With reference now to FIGS. 14 and 15, there is shown and illustrated yet still another garment constructed in accordance with the principles of the present invention and designated generally by the reference character 10d wherein there is provided, rather than a narrow band of elastic 68, a plurality of panels 68d having a primary horizontal stretch characteristic and 68d' having a primary vertical stretch characteristic, disposed within the cutouts 62d and between the folded layers of the mesh inserts 68d and 68d'. The primary horizontal stretch characteristic inserts 68d may be disposed generally adjacent the lateral points of the mesh inserts and the primary vertical stretch characteristic inserts 68d' may be disposed generally at the bottom thereof with the stitching 70c being of generally x configuration so as to define a generally x-shaped area in the medial part of the web insert 66 which is unconstrained by the one-way stretch inserts 68d and 68d'. The inserts 68d may be further secured with the inner panel of the web mesh inserts 66d', as by a line of stitching 70d' extending generally adjacent the waistline 64d.

Referring now to FIGS. 16–18, a band of elastic 68e may be provided in a garment 10e constructed in accordance with the principles of the present invention and extending only across the extent of the cutouts 62e, being secured, for example, only with the inner mesh panel portion 66e', as by means of stitching 70e extending adjacent the waistline 64 and the stitching along the edges of the cutout 62e. The narrow band 68e may be provided alone, or in combination with web inserts 68e' in the manner immediately hereinabove described. Further, the primary vertical stretch web inserts may be extended into the waistband reinforcing region between the front panel 16e and the turned back portion 16e' as indicated by the reference character 17e in FIG. 17 and the respective rear portions thereof. It is to be noted that the x-shaped stitching 70e may, for example, extend only through the one-way vertical stretch inserts 68e' and the outer mesh insert panel 66e.

With particular reference now to FIG. 19, there is shown and illustrated another and still further foundation garment constructed in accordance with the principles of the present invention and designated generally by the reference character 10f wherein there is provided, rather than a single insert 66 at each side of the garment waistband region 60, a multiplicity of generally v-shaped web inserts 66f which alternate with oppositely tapered turned back portions 16f and 20f completely around the waistband area 60f.

Additionally, the garment 10f may comprise a narrow band 68f of elastic extending about the garment 10f adjacent the waistline 64f thereof and secured, as by stitching 70f to the inner insert panels 66f and turned back portions 16f' and 20f', as shown.

Referring now to FIGS. 20–22, there is shown and illustrated another and yet still further foundation garment constructed in accordance with the principles of the present invention and designated generally by the reference character 10g wherein a unitary panel of elastic fabric 16g extends entirely around one side of the garment, between the rear seam 22g and an abdominal support panel 52g at the front of the garment and wherein the cutouts 62g and mesh inserts 66g are of a generally scalloped but still generally wedge-shaped configuration and wherein there is provided a wide band of primarily horizontal stretch elastic 68g, configured to a similar scalloped configuration, disposed between the outer and inner mesh insert panels 66g and 66g', respectively, rather than the narrow band of elastic utilized in the above described garments. The elastic panel 68g may, for example, be secured with the mesh insert panels 66g and 66g' and with the remainder of the garment shell substantially only along the scalloped edge of the cutout 62g, as shown and illustrated. Yet further, the garment 10g may comprise a narrow strip of elastic material 68g' disposed adjacent the waistline edge 64g between the panel 16g and the turned over reinforcing portion 16g' and secured thereto, as by means of stitching 70g extending adjacent the waistline edge 64g.

Another and yet still further foundation garment constructed in accordance with the principles of the present invention and designated generally by the reference character 10h is shown and illustrated in FIGS. 23–25 wherein a wide band of primary horizontal stretch characteristic elastic band 68h having a scalloped lower edge extends entirely circumferentially of the waistband region 60h thereof so as to be coextensive with both the wedge-shaped mesh inserts 66h and the turnover reinforcing panel 16h'. In other words, the elastic band 68h may extend from the waistband 64h downwardly to the stitching 72h.

With reference now to FIGS. 26–29, there is shown and illustrated a yet further garment constructed in accordance with the principles of the present invention and designated generally by the reference character 10k. The structure and configuration of the waistband region 60k of the garment 10k is substantially similar to that of the garment 10g shown and illustrated in FIGS. 20–22 except, rather than the stitching 63 extending entirely through all of the layers of material adjacent the edge of the cutouts 62, as in the garment 10g shown and illustrated in FIGS. 20–22, the stitching 63k extends only through the outer panel 16k, the outer mesh insert panel 66k' and the web of generally horizontal stretch elastic 68k. The inner elastic mesh insert panel 66k may be secured with the turnover portion 16k', as by means of stitching 63k'. It is believed readily obvious, however, that the elastic band 68 may, if desired, be secured only with the outer panel 16, rather than the turnover panel 16', if desired.

In the rear of the garment 10k, a narrow elastic band 68k' may be provided stitched to the turnover panel 16k' adjacent the waistline edge 64k by stitching 70k. In the front portion of the garment 10k, the elastic band 68 may be eliminated, completely, if desired.

Referring now to FIGS. 30 and 31, there is shown and illustrated yet still another garment constructed in accordance with the principles of the present invention and designated generally by the reference character 10m which may be constructed substantially similar to the garment immediately hereinbefore described and illustrated in FIGS. 26–28, except that the inserts 66m and wide elastic band 68m disposed within the cutouts 62m are of generally triangular configuration, rather than being scalloped as in the garments 10k and 10g shown and illustrated in FIGS. 26–28 and 20–22, respectively. In the scalloping of each of the elastic bands 68g and 68k, it is to be noted that the lower edges thereof, somewhere within or adjacent the medial portion thereof extend generally upwardly to define a generally wedge-shaped upstanding cutout defining points designed 69g in FIG. 20 and 69k in FIG. 26 which tend to relieve the restraint imposed adjacent the lower edge of the wide elastic bands 68g and 68k, respectively. In the garment 10m, the triangular wedge-shaped wide elastic band inserts 68f are provided with generally triangular inverted cutouts 69m to provide a reduced restraining effect and a smoother transition at that location. It is to be noted, however, that in the garment 10m that the mesh inserts 66m and the cutouts 62m are of generally triangular wedge-shaped configuration and are not provided with any upstanding points corresponding to the point 69m.

Referring now to FIG. 32, there is shown and illustrated therein yet still another garment constructed in accordance with the principles of the present invention and designated generally by the reference character 10n wherein the mesh insert panels 66n are of generally triangular configuration and the wide, primary horizontal stretch elastic panels 68n are of generally trapezoidal configuration having the longer of the bases disposed generally at the waistline 64n of the garment 10n with the portion thereof adjacent the shorter base extending between the side panel 16n and the turnover reinforcing panel 16n'. The primary horizontal stretch elastic panels 68n may be secured in position as by means of stitching 70n extending generally peripherally thereabout and into engagement with the inner elastic mesh insert panel 66n and the turnover panel 16n' enabling the primary horizontal stretch elastic panel 68n to move relative to the outer mesh insert panel 66n' and the outer side panel 16n.

Referring now to FIGS. 33 and 34, there is shown and illustrated a yet further foundation garment constructed in accordance with the principles of the present invention and designated generally by the reference character 10p wherein the elastic mesh insert panels 66p are of generally triangular configuration and wherein the generally horizontal stretch elastic panels 68p are of generally scalloped configuration extending beyond the periphery of the generally triangular mesh insert panels 66p and being stitched, as by stitching 70p extending along the peripheral scalloped margin thereof and engaging the turnover reinforcing panels 16p'. Additionally, a narrow band of generally horizontal stretch elastic 68p' may be disposed at the rear of the garment 10p adjacent the waistline 64p thereof and secured thereto, as by means of stitching 70p' extending through the upper peripheral edge of the narrow elastic band 68p' and the turnover waistband reinforcing panel 16p', as shown.

Referring now to FIGS. 35–38, there is shown and illustrated another and yet still further panty girdle constructed in accordance with the principles of the present invention and designated generally by the reference character 10s. The garment 10s may comprise a torso-encircling portion 12s and generally vertically downwardly extending leg-encircling portions 14s. The torso-encircling portion 12s may be particularly adapted to encompass the lower torso of the wearer, and specifically those portions thereof known as the abdomen, hips and derriere. The leg portions 14s may be particularly adapted to encompass the legs of the wearer and specifically those portions thereof known as the thighs.

The torso-encircling portion 12s may comprise a pair of panels 16s extending about the sides of the garment and may be joined together, as by stitching along a front center seamline 18s and along a rear center seamline 22s. The panels 16s may be fabricated of any suitable material, and preferably may be fabricated of a material having elastic threads extending in each of a plurality of directions. There is thus present more than adequate distensibility in each of said directions.

Each of the panels 16s may comprise generally vertically downwardly extending leg-encompassing section 26s which, in conjunction with other panels of the garment 10s, to be described hereinafter, may be particularly adapted to encompass the leg of the torso to define the leg-encircling portion 14s. As illustrated, inner panels 30s may be provided, preferably fabricated of the same material as the panels 16s and associated therewith as by means of stitching extending along generally vertically extending leg seams 32s. It will now be understood that the leg-encircling portions 14 are particularly adapted to further comprise suitable fasteners 34s for fastening hosiery (not shown) relative to the garment 10s.

The panels 16s may each be provided with generally curvilinear recesses 36s and 38s, adapted to provide an opening in the crotch and lower rear region, respectively, of the body of the wearer.

Covering the crotch recess there may be provided a crotch panel 40s structurally associated with the panels 16s, as by means of stitching 42s extending along the recesses 36s and 38s. The crotch panel 40s may be further structurally associated with the inner leg panel 30s as by means of stitching 44s and may preferably comprise a soft, smooth, flexible and pliant material for maximum wearer comfort.

The torso-encircling portion 12s of the garment 10s may further comprise abdominal control means, such as a generally polygonal shaped abdominal control panel 52s structurally associated interiorly of the panels 16s, at the front of the garment and underlying the front seamline 18s. The abdominal control panel 52s may preferably comprise elastic material having a primary vertical stretch characteristic and may, as shown and illustrated, be configured to suggest a plurality of overlapping generally diamond-shaped portions and may be structurally associated with the panels 16s, as by means of the stitching extending along the front center seamlines 18s and by stitching 54 extending generally peripherally about the panel 52 and the apparent periphery of the diamond-shaped portions.

The panel 52s may comprise a pair of complementary halves or portions disposed on opposite sides of the front center seamline 18s and positioned relative thereto as by being stitched to the mating edges of the panels 16s prior to joining thereof and the superposed fabric layers formed thereof being stitched along the seamline 18s and opened to form opposed hem 19s, as clearly shown and illustrated.

The garment 10s may be further provided with rear control means, such as a rear control panel 56s fabricated, for example, of two-way stretch material similar to that comprising the panels 16s and structurally associated in the rear of the garment 10, as by means of stitching extending along the rear seamline 22s and stitching 58s extending generally peripherally about the rear control panel 56s. As shown, the rear control panel 56 may be configured generally to the shape of an inverted heart and fabricated of two opposed complementary panel portions stitched to the edges of the panels 16s, seamed along the rear seamline 22s, and the composite seam opened as indicated at 23s.

The upper marginal portion or waistband region 60s of the garment 10s may be further provided with a plurality of cutouts, such as the wedge-shaped cutouts 62s at each side portion thereof extending generally inwardly and downwardly of the garment 10s from the upper margin or waistline 64s thereof. Wedge-shaped elastic fabric means, such as wedge-shaped elastic mesh fabric panels or inserts 66s may be structurally associated with the garment 10s, and particularly, in standing relationship with the cutouts 62s, i.e., extending thereacross and structurally associated with the panels 16s, as by means of stitching 63s extending along the edges of the cutouts 62s, as shown.

The wedge-shaped inserts or elastic mesh fabric panels 66s may be preferably fabricated of material having generally greater stretch than the panels 16s to enable the waistline region of the garment 10 to give extra stretch when the wearer sits, stoops or bends. This extra stretch enables the garment to adjust immediately to the added pressure caused by the flesh shifting when the wearer sits, stoops or bends, thus reducing or substantially eliminating any tendency of the waistband to roll over.

Another benefit is that a woman whose waist size falls between the standard sizes in which garments are normally made can comfortably fit into the garment because the mesh inserts 66s can open to add at least one-half size to the garment. A correlary to this benefit is based on the fact that most garments are graded on a so-called "standard grade" basis; that is, there is a definite and consistent relationship between the hip size and the waist size. While each manufacturer may have his own standards they are generally consistent throughout most of his product line. Since a woman may have a development somewhat at variance with the so-called "standard development," this invention permits her to comfortably wear a standard rather than a custom made garment because the mesh inserts 66s can expand to adjust for slight differences in the wearer's measurements, as compared to the standard development, without much loss of control or slimming action.

Furthermore, the mesh inserts or wedge-shaped elastic mesh fabric panels 66s may comprise a plurality of layers of elastic material inserted, for example, in the cutouts 62s as a double or folded piece of fabric, the fold line thereof being disposed at the upper margin 64s of the garment 10s. To yet further eliminate any tendency of the waistband to roll over, the garment 10s may further comprise a length of, for example, three-quarter inch elastic web 68s having primary horizontal or longitudinal stretch characteristics which may be stitched to one side or layer of the folded elastic mesh 66 before folding to constrict some of the easy stretch thereof.

Further, and to reduce or eliminate any loss of control or slimming power, panels 16s may be folded over at the upper margin 64s providing a reinforced or doubled marginal or turnover region 16s' interiorly of the garment 10s. The web 68s may, for example, be secured along the waistline 64 as by means of stitching 72s prior to folding of the turnover region 16s' and associated portions 66s' of the mesh inserts which may be associated with the turnover region 16s', as by stitching 63s' followed by stitching of the contoured bottom edge of the turnover region 16s', as by means of stitching 72s extending therealong.

The lower marginal portions of the garment 10s and, particularly, the lower ends of the leg-encircling portions 14s may be provided with lace webs or bands 80s extending therealong and fabricated of a stretch lace having a primary horizontal or longitudinal stretch characteristic. The lace 80s may be secured, for example, as by means of stitching 82s.

Accordingly, it is believed readily apparent that each of the garments hereinabove described, disclosed, illustrated and shown and constructed in accordance with the principles of the present invention fulfills each and every one of the above-mentioned objects and, particularly, that each of the garments constructed in accordance with the principles of the present invention are economic to manufacture, comfortable in use, are constructed and arranged to substantially reduce or entirely eliminate any tendency of the waistband region to roll over without suffering from much or any loss of control or slimming power in the waistband region, are capable of being comfortably worn by wearers having dimensions falling between standard girth sizes or wearers having a "nonstandard development" and that the principles of the present invention are equally applicable to garments in general, and particularly to garments other than panty girdles.

It is to be expressly understood that terminology such as "upper," "lower," "front," "rear," "upwardly," "downwardly," "inwardly," "outwardly," "horizontally," "vertically," "laterally" and "longitudinally," as used in the preceding description and subjoined claims, along with other similar directional terminology, is to be construed and interpreted in its normal and accepted sense. However, such terminology is not to be construed or interpreted in a limiting sense either in the preceding description or the subjoined claims, since the same is used merely to facilitate an understanding of, and to clearly set forth and particularly define the present invention.

While the invention has been described, disclosed, illustrated and shown in terms of specific embodiments or modifications which it has assumed in practice, the scope of the invention should not be deemed to be limited by the precise embodiments or modifications herein described, disclosed, illustrated or shown, such other embodiments or modifications as may be suggested to those having the benefit of the teachings herein being intended to be reserved especially as they fall within the scope and breadth of the claims hereto appended.

What is claimed is:

1. Foundation garment for encircling a torso to provide molding and support thereto especially at those regions known as the hips, abdomen and derriere having a waist-encircling portion including a waistband provided with spaced apart regions of increased and decreased elasticity at the upper margin or waistline to reduce or substantially preclude rolling and wrinkling wherein said waist-encircling portion is provided with a plurality of wedge-shaped cutouts at each side portion thereof and wedge-shaped elastic panels of high distensibility disposed within said cutouts tapering downwardly from the waistline to produce a lesser effect as the distance downwardly of the waistline increases and a reinforcing band secured with said waistband at least between said cutouts extending downwardly substantially the entire length thereof for balancing the high distensibility thereof and providing a substantially uniform average control around said waist-encircling portion so that the garment may comfortably accommodate a range of waist dimensions while providing a smooth transition of restraint throughout the waistband region and to reduce or substantially preclude the waistband portion from rolling over and wrinkling.

2. Foundation garment defined in claim 1 wherein said wedge-shaped insert is fabricated of generally easy two-way stretch mesh material.

3. Foundation garment defined in claim 1 wherein said cutouts and wedge-shaped elastic panels comprise a series of inserts disposed in generally equally spaced apart orientation around the waistband.

4. Foundation garment defined in claim 3 wherein said inserts comprise a generally downwardly scalloped configuration.

5. Foundation garment defined in claim 4 wherein said scalloped configuration comprises at least one generally upwardly directed wedge-shaped recess.

6. Foundation garment defined in claim 3 wherein said inserts comprise a panel of mesh material folded along the waistline to define double superposed panels extending generally downwardly thereof.

7. Foundation garment defined in claim 1 wherein said band comprises an elastic panel disposed substantially peripherally of said cutouts and tapering downwardly so that the average elasticity of the waistband portion remains generally constant as the distance downwardly from the waistline varies.

8. Foundation garment comprising, in combination, means for encircling a torso to provide molding and support thereto especially at those regions known as the hips, abdomen and derriere and having an elastic waistband portion, a region of reduced elasticity disposed within the waistband portion and tapering downwardly from the waistline to produce a lesser effect as the distance downwardly of the waistline increases so that the garment may comfortably accommodate a range of waist dimensions while providing a smooth transition of restraint throughout the waistband region, and a region of increased elasticity comprising, in turn, a reinforcing panel of two-way stretch elastic fabric disposed within the waistband region outwardly of said region of reduced elasticity to preclude loss of control and slimming power and having a generally decreasing width tapering downwardly from a maximum width disposed generally at the waistline to produce a restraining effect which tapers downwardly of the waistline so that the average elasticity of the waistband portion remains generally constant to provide for generally uniform control and slimming power, enabling the reduction or substantial preclusion of rolling over and wrinkling.

9. Foundation garment defined in claim 8 wherein said reinforcing panel is of generally downwardly wedge-shaped configuration.

10. Foundation garment defined in claim 8 wherein said reinforcing panel is of generally downwardly scalloped configuration.

11. Foundation garment defined in claim 8 wherein said reinforcing panel extends substantially laterally completely around said garment having a minimum depth beneath said region of reduced elasticity.

12. Foundation garment defined in claim 8 wherein said reinforcing panel comprises a turn-over portion of the torso-encircling means folded along the waistline.

13. Foundation garment defined in claim 1 further comprising a narrow band of elastic material having a generally horizontal primary stretch characteristic structurally associated with the waistband portion extending along the waistline edge portions of said inserts to enable the garment to adjust to added pressures caused by shifting of flesh when the wearer moves particularly by expanding below the waistline edge.

14. Foundation garment defined in claim 13 wherein said waistband comprises a plurality of fabric layers and wherein said narrow elastic band is secured only with the inner of said layers.

15. Foundation garment defined in claim 13 wherein said waistband comprises a plurality of fabric layers and wherein said narrow elastic band is secured only with the outer of said layers.

16. Foundation garment defined in claim 13 wherein said narrow elastic band is secured with said wedge-shaped elastic panels by a single line of stitching extending therealong adjacent the lower edge thereof.

17. Foundation garment defined in claim 13 wherein said narrow elastic band extends substantially entirely around the garment adjacent the waistline.

18. Foundation garment defined in claim 1 further comprising a narrow elastic band means extending between said cutouts adjacent the waistline.

19. Foundation garment defined in claim 1 further comprising elastic panel means having a generally horizontally primary stretch characteristic structurally associated with the waistband portion generally adjacent the waistline thereof, wherein said elastic panel comprises a generally trapezoidal panel having the longer or major base thereof disposed adjacent the waistline extending downwardly therefrom through said cutout.

20. Foundation garment defined in claim 1 wherein said elastic panel is provided with a generally equilateral triangular notch having the base thereof generally coextensive with the shorter or minor trapezoidal base and extending generally upwardly thereof into said elastic panel.

21. Foundation garment defined in claim 2 wherein said reinforcing band comprises a region of increased elasticity disposed within the waistband portion outwardly of said cutouts to preclude a loss of control and slimming power and tapering downwardly so that the average elasticity of the waistband portion remains generally constant to provide for generally uniform control and slimming power.

22. Foundation garment defined in claim 16 wherein said region of increased elasticity comprises a turn-over portion of the torso-encircling means folded inwardly along the waistline and having a generally decreasing width from a maximum width disposed generally at the waistline to produce a restraining effect which tapers downwardly of the waistline and wherein said elastic means comprises a narrow band extending substantially entirely around the garment adjacent the waistline and inside the fold thereat and secured by means of stitching extending along the upper margin thereof and engaged with the turnover panel and inner mesh insert panels.

23. Foundation garment defined in claim 22 wherein said torso-encircling means comprises an elastic fabric having two-way stretch characteristics and further comprising an abdominal control panel comprising an elastic fabric panel configured to represent two overlapping generally diamond-shaped panel portions having a generally vertical primary stretch characteristic and secured generally across the front center portion of the torso-encircling means.

References Cited
UNITED STATES PATENTS

| | | | |
|---|---|---|---|
| 2,068,493 | 1/1937 | Kispert | 128—556 |
| 2,274,770 | 3/1942 | Amyot | 128—578 |
| 2,563,308 | 8/1951 | Chase et al. | 128—541 |
| 2,774,073 | 12/1956 | Herbener | 128—539 |
| 2,904,048 | 9/1959 | Schamber | 128—540 |
| 2,932,298 | 4/1960 | Chubby | 128—541 |
| 3,060,938 | 10/1962 | Katterman et al. | 128—540 |
| 3,245,410 | 4/1966 | Martin | 128—541 |

ADELE M. EAGER, Primary Examiner

U.S. Cl. X.R.

128—547, 556